United States Patent
Donovan et al.

(10) Patent No.: US 9,258,454 B2
(45) Date of Patent: Feb. 9, 2016

(54) PRINTER OPTICAL SENSING ERROR DETERMINATION

(75) Inventors: David H Donovan, San Diego, CA (US); Behnam Bastani, San Diego, CA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 3221 days.

(21) Appl. No.: 11/356,362

(22) Filed: Feb. 16, 2006

(65) Prior Publication Data

US 2007/0188815 A1     Aug. 16, 2007

(51) Int. Cl.
   *H04N 1/333*     (2006.01)
   *H04N 1/387*     (2006.01)
   *H04N 1/00*     (2006.01)

(52) U.S. Cl.
   CPC ......... *H04N 1/3878* (2013.01); *H04N 1/00002* (2013.01); *H04N 1/00005* (2013.01); *H04N 1/00015* (2013.01); *H04N 1/00031* (2013.01); *H04N 1/00045* (2013.01); *H04N 1/00053* (2013.01); *H04N 1/00063* (2013.01); *H04N 1/00068* (2013.01); *H04N 1/00087* (2013.01); *H04N 1/00681* (2013.01); *H04N 1/00702* (2013.01); *H04N 1/00718* (2013.01); *H04N 1/00734* (2013.01); *H04N 1/00761* (2013.01); *H04N 1/00779* (2013.01)

(58) Field of Classification Search
   CPC .................. G03G 15/60; G03G 15/00; G03G 2215/00185
   USPC .................. 358/1.6, 488, 1.18, 504; 347/248; 714/814; 399/380; 250/559.3
   See application file for complete search history.

(56) References Cited

U.S. PATENT DOCUMENTS

| | | | |
|---|---|---|---|
| 4,605,970 A | 8/1986 | Hawkins | |
| 4,620,233 A | 10/1986 | Ogawa et al. | |
| 5,194,966 A | 3/1993 | Quardt et al. | |
| 5,644,344 A | 7/1997 | Haselby | |
| 6,161,914 A | 12/2000 | Haselby | |
| 6,232,991 B1 | 5/2001 | Appel | |
| 6,470,099 B1 * | 10/2002 | Dowdy | G06K 9/3216 358/488 |
| 6,785,011 B1 | 8/2004 | Cook | |
| 6,903,758 B1 | 6/2005 | Kerxhalli et al. | |
| 6,937,369 B2 | 8/2005 | Shih et al. | |
| 7,161,514 B2 * | 1/2007 | Tamba | H03M 1/1038 341/120 |
| 7,297,972 B2 * | 11/2007 | Bruland | B23K 26/04 219/121.6 |
| 7,420,719 B2 * | 9/2008 | Mongeon | H04N 1/00002 358/406 |
| 2002/0080427 A1 | 6/2002 | Clifton | |
| 2003/0095294 A1 | 5/2003 | Shih et al. | |
| 2003/0189611 A1 | 10/2003 | Fan et al. | |
| 2003/0208717 A1 * | 11/2003 | Klotchkov | G01R 31/31725 714/814 |
| 2004/0169888 A1 * | 9/2004 | Eveland | H04N 1/00708 358/1.18 |
| 2004/0179051 A1 | 9/2004 | Tainer et al. | |
| 2004/0190961 A1 * | 9/2004 | Pyle | G03G 15/60 399/380 |
| 2005/0024415 A1 | 2/2005 | Claramunt et al. | |

\* cited by examiner

*Primary Examiner* — Akwasi M Sarpong
(74) *Attorney, Agent, or Firm* — Fabian Van Cott

(57) ABSTRACT

Embodiments of printer optical sensing error determination are disclosed.

24 Claims, 3 Drawing Sheets

PRINTER OPTICAL SENSING ERROR DETERMINATION

BACKGROUND

Printers and other image producing devices sometimes include optical sensors that are used to monitor printhead or pen position, e.g., in relation to a print area or print zone. These optical sensors often take erroneous measurements and may not provide an orthogonally accurate measuring system or device for the printer.

BRIEF DESCRIPTION OF THE DRAWINGS

Detailed description of embodiments of the present disclosure will be made with reference to the accompanying drawings.

DETAILED DESCRIPTION

The following is a detailed description for carrying out embodiments of the present disclosure. This description is not to be taken in a limiting sense, but is made merely for the purpose of illustrating the general principles of the embodiments of the present disclosure.

The present invention involves a method for calibrating a built-in measuring device of a printer (to compensate for orthogonality or other geometry-related sensing errors in the measuring device), independent of printhead alignment/calibration and, in some embodiments, without the need for an external measuring device with properly constructed and calibrated orthogonal axes. In an embodiment, an accurate calibration object, e.g., a sheet of paper or plastic printed with one or more known reference patterns, is used to determine these errors which can later be used to correct measurements made by the measuring device. Thus, among other things, embodiments described herein allow non-orthogonal physical sensing hardware to be used as an orthogonal measurement system.

The process of determining these errors includes determining the skew of the positioning of the calibration object, and removing this skew component from the total error measured.

The process of determining these errors also includes determining "platen non-uniformity"—imperfections in the planarity and parallelism of the printing surface in relation to the measuring device (e.g., optical sensor). Printers that use vacuum to hold paper on the print platen in particular may have significant variations in z (vertical) height due to warpage of the print platen under vacuum, resulting in "platen non-uniformity".

The total positional error measured in the x and y axes, less the skew component and the platen non-uniformity component, is attributable to media x-y misplacement (typically caused by imperfect mechanical tolerances). Once media misplacement is determined, it can be used to perform a media placement calibration (e.g., at the factory, storing the calibration data in a memory device in the printer).

Use of an externally generated calibration object avoids non-uniformities introduced by errors in the printing elements of the system. Calibrating the orthogonality of the printing device (rather than the built-in measuring device) is a separate and distinct process which is done as part of the printhead calibration process. After the built-in measuring device is calibrated by the method described herein, the built-in measuring device (which now functions as an orthogonal measuring system) can in turn be used for calibrating the orthogonality of the printing device.

Figure 1:
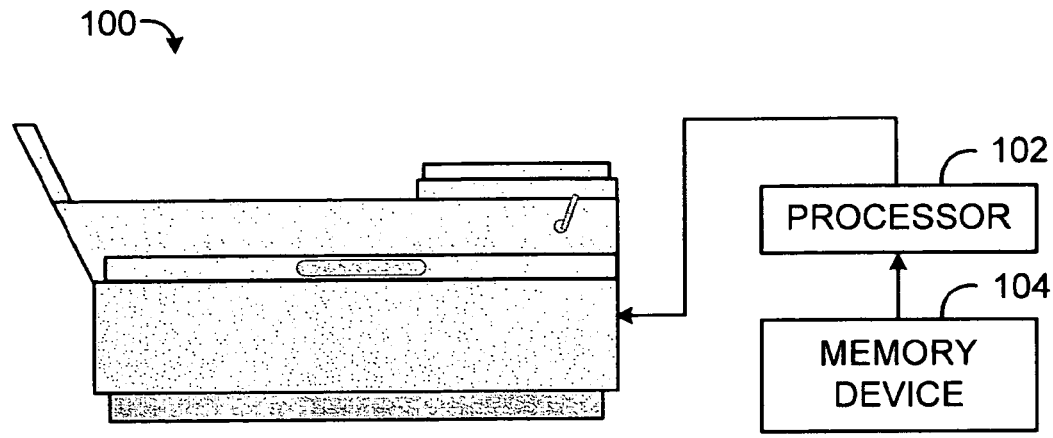
FIG. 1 shows an embodiment of a printer with a processor and memory device.

FIG. 1 shows an embodiment of a printer 100 with a processor 102 and memory device 104. The processor 102 accesses and executes a program stored in the memory device 104 to control components of the printer 100 to perform a printer optical sensor error determination function as described herein. In an embodiment, the printer 100 includes a built-in optical sensor. The processor 102 and memory device 104 can be part of the printer 100 or located outside of the printer 100 and interfaced with the printer 100 via a communications interface (such as the Internet or another communications network). In an embodiment, the communications interface is wireless or includes wireless portions.

Figure 2:
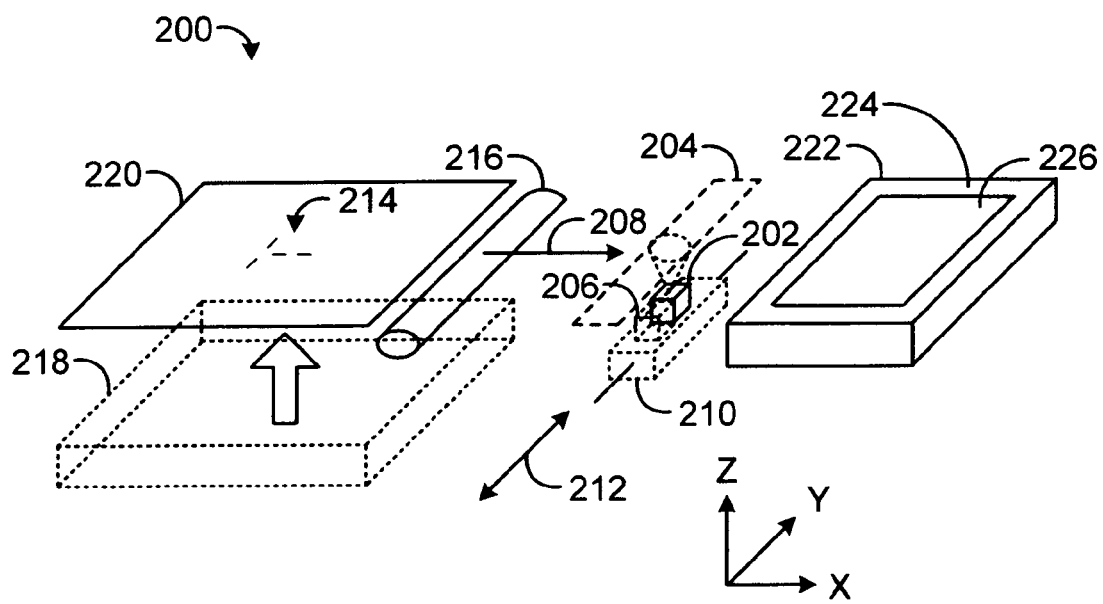
FIG. 2 shows an embodiment of a printer optical sensor error determination apparatus.

Referring to FIG. 2, an embodiment of a printer optical sensor error determination apparatus 200 includes an optical imaging device 202 configured for measuring reflectance of an object positioned over an imaging area 204 (shown in dashed lines) and for providing image data to a printing device 206. The printer optical sensor error determination apparatus 200 also includes a mechanism for determining two-dimensional, positional sensing errors of the optical imaging device 202, e.g., referring to FIG. 1, the mechanism is implemented in the processor 102 and memory device 104. In FIG. 2, it should be understood that components are not necessarily proportional in size and, in some instances, are illustrated in an expanded or exploded fashion for better visual clarity.

The optical imaging device 202 can be a zero-dimensional ("spot") sensor (e.g., a photodiode and light source) scanned relative to the media in two axes, a one-dimensional ("line") sensor (e.g., a linear array sensor such as a linear charge coupled device (CCD)) scanned in one axis, or a fixed two-dimensional image sensor (e.g., a two-dimensional CCD, or a camera). In an embodiment, the optical imaging device 202 is a photodiode/LED-based sensor. By way of example, in a photodiode/LED-based sensor embodiment, the optical imaging device 202 is separated from the imaging area 204 by a distance of approximately 11 mm. The printing device 206 includes, for example, one or more image imparting mechanisms, lasers, pens, or the like. In this embodiment, the optical imaging device 202 and the printing device 206 are operatively interfaced with a media path (denoted by arrow 208) by a transport mechanism 210 (shown in dashed lines) such as a carriage, shuttle, scan mechanism, or the like which repositions the optical imaging device 202 and the printing device 206, as denoted by arrow 212, in relation to the media path. It should be understood that the printing device 206 does not have to be configured to move in concert with the optical imaging device 202. Furthermore, the printing device 206 can be positioned at a different place along the media path and/or be repositioned independently in relation to the media path.

The mechanism for determining two dimensional, positional sensing errors includes a reference pattern 214 that is imaged by the optical imaging device 202. In this embodiment, a pick roller 216 (or the like) provides a mechanism for picking an article of media from a media stack 218 (shown in dashed lines) and for positioning the article of media over the imaging area 204. The article of media does not have to be a sheet of media from a stack; it can be provided as a continuous roll, roll singulated (cut to sheet) in printer, or sheet-at-a-time. In an embodiment, the reference pattern 214 is orthogonal. In an embodiment, the reference pattern 214 is pre-printed. In an embodiment, the reference pattern 214 is a known pattern (calibration pattern) that is provided at a known orientation on an article of media 220 (e.g., a Mylar print) which is dimensionally stable and compatible with the pick mechanism and a media hold down mechanism. In an embodiment, a media hold down mechanism 222 includes a manifold 224 and vacuum 226 as shown. It should be appreciated that the reference pattern 214 can be provided on objects other than articles of media.

In an embodiment, the mechanism for determining two dimensional, positional sensing errors includes an image processor, e.g., implemented in the processor 102 (FIG. 1), programmed to determine a skew of the reference pattern 214 in relation to the optical imaging device 202. In an embodiment, the mechanism for determining two-dimensional, positional sensing errors includes an image processor programmed to determine a distance and/or angle variation between the reference pattern 214 and the optical imaging device 202. In an embodiment, the media hold down mechanism 222 contributes to the distance and/or angle variation. When the media hold down mechanism 222 includes a vacuum, the distance and/or angle variation can be referred to as a "vacuum non-uniformity".

In an embodiment, an apparatus includes a printing device operatively interfaced with a media path, an imaging area along the media path, means for positioning an article of media over the imaging area, an optical imaging device configured for measuring reflectance of an object positioned over the imaging area and for providing image data to the printing device, and means for determining two-dimensional, positional sensing errors of the optical imaging device.

In an embodiment, an apparatus includes a printing device operatively interfaced with a media path, an imaging area along the media path, means for positioning an article of media over the imaging area, an optical imaging device configured for measuring reflectance of an object positioned over the imaging area and for providing image data to the printing device, and an image processor programmed to process image data of a reference pattern that is imaged by the optical imaging device to determine a skew of the reference pattern in relation to the optical imaging device and to determine a distance and/or angle variation between the reference pattern and the optical imaging device.

Figure 3:
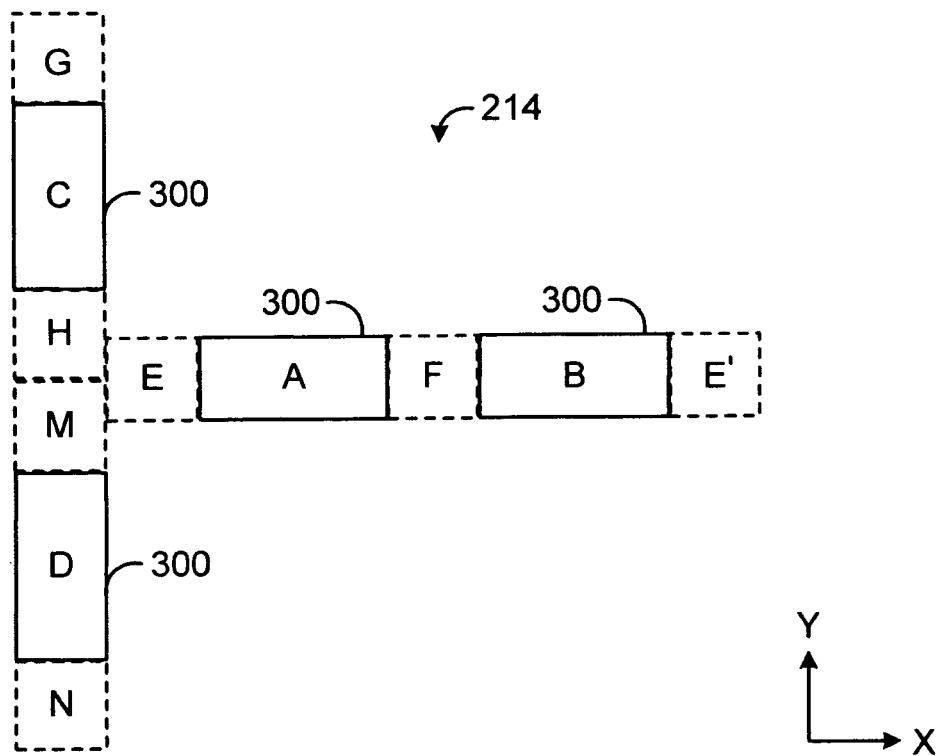
FIG. 3 shows an embodiment of a reference pattern for the printer optical sensor error determination apparatus of FIG. 2.
Figure 4:
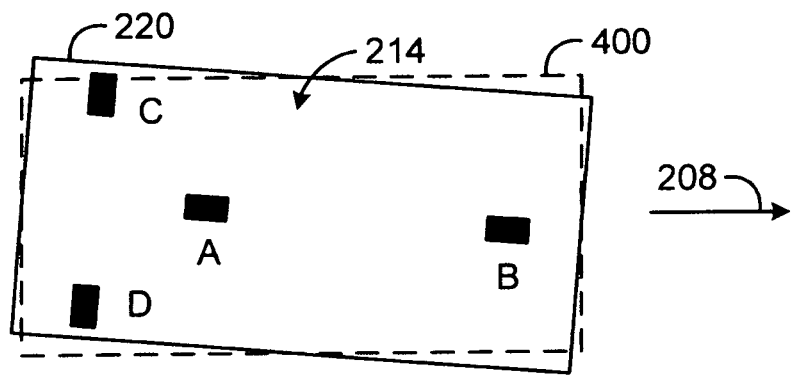
FIG. 4 shows an embodiment of the reference pattern skewed with reference to an optical imaging device.

FIG. 3 shows an embodiment of the reference pattern 214, and FIG. 4 shows an embodiment of the reference pattern 214 (provided on an article of media 220) skewed in relation to a zero-skew reference 400 (shown with dashed lines) for the optical imaging device 202. In this example, the zero-skew reference 400 indicates a position where the article of media 220 would overlay if there were no skew or other errors, i.e., an idealized scenario where many exacting mechanical tolerances would be imposed upon the system design. The techniques described herein permit printer apparatuses to be designed with larger tolerances for imperfections in x and y axis orthogonality.

In an embodiment, the reference pattern 214 includes reference regions 300 (shown in FIG. 3 as an outline only) which are black in color, or substantially non-reflective. In an embodiment, the reference regions 300 (denoted "A", "B", "C", and "D", respectively) are rectangular shaped and arranged as shown in FIG. 3, generally in a central portion of the article of media 220 as shown in FIG. 1. In FIG. 4, for greater visual clarity, the reference regions 300 are shown distributed over a larger portion of the article of media 220. It should be appreciated that the positioning of the reference pattern 214 on the article of media 220 can vary, as well as the number, shape, aspect ratio, orientation, color, reflectance and relative spacing of the reference regions 300.

Referring to FIG. 3, the dimensions of region A along the X-axis and Y-axis are denoted $A_X$ and $A_Y$, respectively; the dimensions of region B along the X-axis and Y-axis are denoted $B_X$ and $B_Y$, respectively, etc. In this example, regions E, F, G, H, M, and N (outlined in dashed lines) are higher reflectance regions, e.g., white or non-printed portions of the article of media 220. In an embodiment, $A_X$, $B_X$, $C_Y$, and $D_Y$ are approximately 2 cm; $A_Y$, $B_Y$, $C_X$, and $D_X$ are approximately 0.12 cm; and $E_X$, $F_X$, $H_Y$, and $M_Y$ are approximately 1-2 cm. In an embodiment, the reference regions 300 are printed using printers (not shown in the figures) that are mechanically capable of printing right angle lines with a negligible angular error (e.g., 90.00+/−0.10 degrees). The accuracy needed will depend on the types and precision of calibrations the optical sensing system will later be used for. For devices requiring only simple calibrations, larger errors in the calibration object may be acceptable. In an alternate embodiment, the reference regions 300 may be printed with errors exceeding this limit, which are measured to an accuracy below the limit using, for example, a high precision metrology device; this additional measured skew error is then subtracted in the skew correction calculations.

In an embodiment, the image processor (e.g., processor 102) is programmed to determine centers of the reference regions 300 and to use the centers to determine the skew of the reference pattern 214 in relation to the optical imaging device 202. In an embodiment, the image processor (e.g., processor 102) is programmed to determine reflectance values resulting from the optical imaging device 202 imaging the reference regions 300 and to use the reflectance values to determine the distance and/or angle variation between the reference pattern 214 and the optical imaging device 202.

Figure 5:
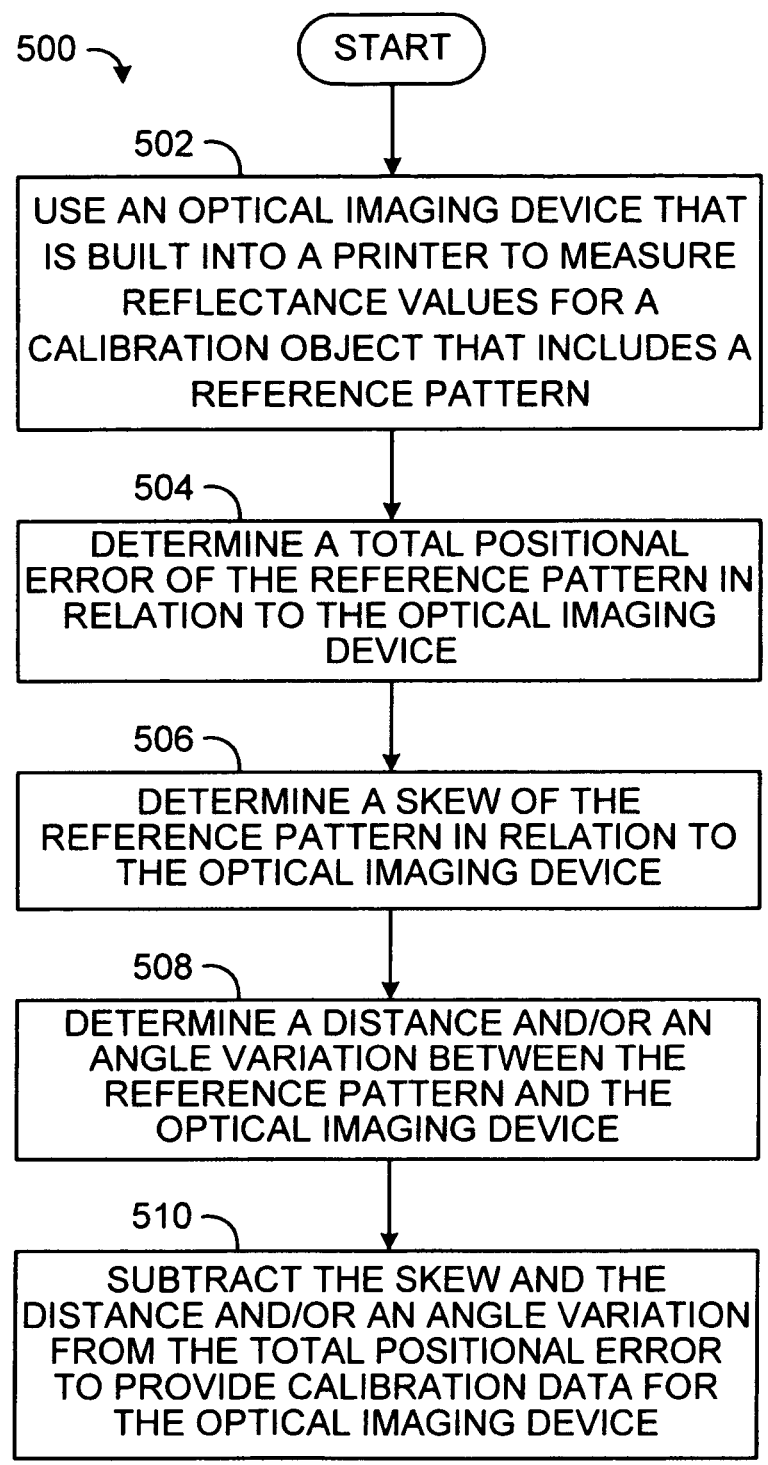
FIG. 5 is a flowchart for an embodiment of a printer optical sensor error determination method.

Referring to FIG. 5, an embodiment of a printer optical sensor error determination method 500 includes, at 502, using an optical imaging device that is built into a printer to measure reflectance values for a calibration object that includes a reference pattern. At 504, a total positional error of the reference pattern in relation to the optical imaging device is determined. At 506, a skew of the reference pattern in relation to the optical imaging device is determined. In an embodiment, the reference pattern includes reference regions, and determining the skew includes processing the reflectance values to determine centers of the reference regions. At 508, a distance and/or an angle variation between the reference pattern and the optical imaging device is determined. In an embodiment, the reference pattern includes reference regions, and determining a distance and/or an angle variation includes processing the reflectance values and dividing reflectance values of the reference regions by reflectance values of calibration object regions adjacent to the reference regions. The reference regions can be any color, and a particular ink reflectance for the reference regions is not required. Because processing the reflectance values involves taking ratios as described herein, determining the distance and/or angle variation is not affected by variations in media glossiness or ink reflectance (from one calibration object to another), by differences in the ambient light environment from one printer to another, or by the choice of color or reflectance of the ink used for the reference pattern. At 510, the skew and the distance and/or an angle variation is subtracted from the total positional error to provide calibration data for the optical imaging device.

In an embodiment, a device for calibrating an optical imaging device in a printer includes a memory device upon which is stored a machine-readable program which, when executed by a processor, controls the processor to receive image data of a calibration object scanned by an optical imaging device of a printer, the calibration object including a reference pattern, process the image data to determine a total positional error of the reference pattern in relation to the optical imaging device, process the image data to determine a skew of the reference pattern in relation to the optical imaging device, process the image data to determine a distance and/or an angle variation between the reference pattern and the optical imaging device, and subtract the skew and the distance and/or an angle variation from the total positional error to provide calibration data for the optical imaging device. In an embodiment, the reference pattern includes reference regions, and the machine-readable program is programmed to process the image data to determine centers of the reference regions and to use the centers to determine the skew. In an embodiment, the reference pattern includes reference regions, and the machine-readable program is programmed to process the image data to determine reflectance values resulting from the optical imaging device imaging the reference patterns and to use the reflectance values to determine the distance and/or angle variation.

An embodiment of a media placement calibration method is described below. In this example, the printer includes a vacuum operatively interfaced with a media path of the printer; however, it should be appreciated that other mechanisms can be used to guide articles of media through a printer and that the principles described herein are also applicable to determining errors attributable to such mechanisms. In this embodiment, the media displacement distance in the x and or y axes is determined by subtracting the print platen (vacuum) non-uniformity (which can be removed using bow-compensation) and the skew of the media on the vacuum from the overall displacement. By way of example, and referring to FIG. 3, skew is removed by determining the center of regions A and B. More generally, determining the location of any two points of the reference pattern 214 allows the skew to be determined.

In an embodiment, after the article of media 220 with the reference pattern 214 is loaded, the calibration process is initiated (e.g., by a user selecting an option from a printer service menu or the like.) In an embodiment, the printer is blocked from performing other activities during the calibration process.

In an embodiment, the transport mechanism 210 is used to move the optical imaging device 202 over the reference pattern 214 in order to make bow compensation measurements. In an embodiment, the regions A, B, C and D are imaged and their reflectance values (hereinafter denoted A, B, C and D) are measured by the optical imaging device 202 and stored in the memory device 104. Similarly, the regions E, F, E', G, H, M and N are imaged and their reflectance values (hereinafter denoted E, F, E', G, H, M and N) are measured and stored. In an embodiment, regions A, B, E, F and E' are scanned along the Y-axis, and regions C, D, G, H, M and N are scanned along the X-axis. In an embodiment, the reflectance values are averages of multiple measurements.

The average of the reflectance values measured at locations E and F are stored as A'; bow compensation $Bow_A$ is determined by dividing the reflectance at position A by A'. Similarly, the average of reflectances at E' and F is stored as B', and bow compensation $Bow_B$ is determined by dividing B by B'. The average value of G and H is stored as C'; and bow compensation $Bow_C$ is determined by dividing C by C'. The average value of M and N is stored as D'; and bow compensation $Bow_D$ is determined by dividing D by D'. In an embodiment, each value ($Bow_A$, $Bow_B$, ...) is considered separately in providing compensation for platen non-uniformity (e.g., caused by vacuum).

In an embodiment, a measurement of skew includes finding center locations of the reference regions 300. After applying bow compensation to remove the platen non-uniformity, the center of each reference region is determined.

In an embodiment, a Gaussian fitting is used to find the centers using the general formula of the Gaussian curve:

$$f(x) = \text{Amplitude} * \text{Exp}\left(\frac{-(x-\text{center})^2}{sigma^2}\right) + \text{BaseLine} \quad \text{Equation 1}$$

For simplicity, the base line is removed, and the following is provided by taking the derivative curve:

$$f'(x) = \text{Amplitude} * \text{Exp}\left(\frac{-(x-\text{center})^2}{sigma^2}\right) * \frac{-2*(x-\text{center})}{sigma^2} \quad \text{Equation 2}$$

Substituting Equation 1 into Equation 2 yields:

$$f'(x) = f(x) * \frac{-2*(x-\text{center})}{sigma^2} \quad \text{Equation 3}$$

Reordering the factors results in:

$$\frac{f'(x)}{f(x)} = \frac{-2}{sigma} * (x-\text{center}) \quad \text{Equation 4}$$

This curve has the property that is linear and is null when x is the maximum of the normal curve (the center of the reference region). Consequently, the complexity of the problem is reduced from a fitting to a normal curve (iterative and matrix calculus) to a fitting to a linear curve (one step and linear calculus).

In another embodiment, a center of gravity algorithm is used to determine the centers of the reference regions 300. In this approach, reflectance (signal) data is collected by the optical imaging device 202 and associated with each measurement location (position) in the article of media 220. The center is determined using the following:

$$\text{center} = \frac{\sum(\text{signal} * \text{position})}{\sum \text{position}}.$$

By using the centers of the reference regions 300, e.g., (Axc, Ayc), (Bxc, Byc), the skew of the article of media 220 is calculated as follows: S=arctan ((Byc−Ayc)/(Bxc−Axc)). The optical imaging device X displacement=Cxc−Dxc−(Cyc−Dyc)*tan(S).

For an embodiment including a linear array sensor in a scanner, an orthogonalized corrected image can be provided by shifting pixels from different sensor elements (e.g., CCD elements) depending upon the determined angle of the array in relation to the reference pattern.

The general principles described herein can be applied in other ways to address geometry problems in printer mechanisms. For example, a Y axis motion which looks like an "S" curve or other random shape can be compensated for by piecewise measuring the motion, fitting a polynomial to it, and correcting for it in later measurements.

In an embodiment, a method includes generating image data using an optical imaging device of a printer to image a reference pattern (e.g., an orthogonal reference pattern printed on an article of media), and processing the image data to determine two-dimensional, positional sensing errors of the optical imaging device. In an embodiment, processing the image data includes determining a skew of the reference pattern in relation to the optical imaging device. In an embodiment, the reference pattern includes reference regions, and determining the skew includes processing the image data to determine centers of the reference regions. In an embodiment, processing the image data includes determining a distance and/or angle variation between the reference pattern and the optical imaging device. In an embodiment, the reference pattern includes reference regions, and determining a distance and/or an angle variation includes processing the image data and comparing image data associated with the reference regions with image data associated with regions adjacent to the reference regions. In an embodiment, processing the image data includes determining a skew of the reference pattern in relation to the optical imaging device, and determining a distance and/or angle variation between the reference pattern and the optical imaging device. In an embodiment, processing the image data includes determining a total positional error of the reference pattern in relation to the optical imaging device. In an embodiment, the method further includes subtracting the skew and the distance and/or angle variation from the total positional error to provide calibration data for the optical imaging device.

The methods and apparatuses described herein provide a way of accurately measuring positions in two orthogonal directions (and, more generally, measuring positions in two-dimensions) without the need for accurately machined, measured or assembled parts other than the calibration object. The use of an externally generated calibration object as described herein avoids non-uniformities introduced by errors in the printing elements of the system.

The methods and apparatuses described herein allow non-orthogonal physical sensing hardware to be used as an orthogonal measurement system, thus providing a low cost built-in measuring device for a printer. The measuring device is, in turn, suitable for calibrating the printer (including, but not limited to, a flat tray printer), printhead, etc.

Although embodiments of the present disclosure have been described in terms of the embodiments above, numerous modifications and/or additions to the above-described embodiments would be readily apparent to one skilled in the art. It is intended that the scope of the claimed subject matter extends to all such modifications and/or additions.

What is claimed is:

1. A method, comprising:
   generating image data using an optical imaging device of a printer to image a reference pattern;
   compensating for platen non-uniformity, the platen non-uniformity comprising variations in vertical height and angle due to warpage of a platen under vacuum; and
   processing the image data to determine two-dimensional, positional sensing errors of the optical imaging device.

2. The method of claim 1, wherein processing the image data includes determining a skew of the reference pattern in relation to the optical imaging device.

3. The method of claim 2, wherein the reference pattern includes reference regions, and determining the skew includes processing the image data to determine centers of the reference regions.

4. The method of claim 1, wherein processing the image data includes determining a distance and/or angle variation between the reference pattern and the optical imaging device.

5. The method of claim 4, wherein the reference pattern includes reference regions, and determining a distance and an angle variation includes processing the image data and comparing image data associated with the reference regions with image data associated with regions adjacent to the reference regions.

6. The method of claim 1, wherein processing the image data includes determining a skew of the reference pattern in relation to the optical imaging device, and determining a distance and angle variation between the reference pattern and the optical imaging device.

7. The method of claim 6, wherein processing the image data includes determining a total positional error of the reference pattern in relation to the optical imaging device.

8. The method of claim 7, further including: subtracting the skew and the distance and/or angle variation from the total positional error to provide calibration data for the optical imaging device.

9. A device for calibrating an optical imaging device in a printer, the device comprising: a memory device upon which is stored a machine-readable program which, when executed by a processor, controls the processor to receive image data of a calibration object scanned by an optical imaging device of a printer, the calibration object including a reference pattern, process the image data to determine a total positional error of the reference pattern in relation to the optical imaging device, process the image data to determine a skew of the reference pattern in relation to the optical imaging device, process the image data to determine a vacuum induced vertical distance and an angle variation between the reference pattern and the optical imaging device, and subtract the skew and the distance and an angle variation from the total positional error to provide calibration data for the optical imaging device.

10. The device of claim 9, wherein the reference pattern includes reference regions, and the machine-readable program is programmed to process the image data to determine centers of the reference regions and to use the centers to determine the skew.

11. The device of claim 9, wherein the reference pattern includes reference regions, and the machine-readable program is programmed to process the image data to determine reflectance values resulting from the optical imaging device imaging the reference patterns and to use the reflectance values to determine the distance and angle variation.

12. An apparatus, comprising:
   a printing device operatively interfaced with a media path;
   an imaging area along the media path; means for positioning an article of media over the imaging area;
   an optical imaging device configured for measuring reflectance of an object positioned over the imaging area and for providing image data to the printing device; and
   an image processor programmed to process image data of a reference pattern that is imaged by the optical imaging device to determine a skew of the reference pattern in relation to the optical imaging device and to determine a distance and angle variation between the reference pattern and the optical imaging device, wherein the distance variation is for compensating for platen non-uniformity, the platen non-uniformity comprising warpage of a platen under vacuum.

13. The apparatus of claim 12, wherein the reference pattern includes reference regions, and the image processor is programmed to determine centers of the reference regions and to use the centers to determine the skew.

14. The apparatus of claim 12, wherein the reference pattern includes reference regions, and the image processor is programmed to determine reflectance values resulting from the optical imaging device imaging the reference regions and to use the reflectance values to determine the distance and angle variation.

15. The apparatus of claim 12, further including: a media hold down mechanism which in operation contributes to the distance and angle variation.

16. The apparatus of claim 15, wherein the media hold down mechanism includes the vacuum, the vacuum contributing to the platen non-uniformity.

17. The apparatus of claim 12, wherein the optical imaging device is a spot sensor.

18. The apparatus of claim 12, wherein the reference pattern is printed on the article of media using a colored ink.

19. The apparatus of claim 12, wherein compensating for the platen non-uniformity includes averaging reflectance values of at least two locations on each side of a first location and dividing the reflectance at the first location by the averaged reflectance values.

20. The apparatus of claim 19, wherein compensating for the platen non-uniformity includes averaging reflectance values of at least two more locations on each side of a second location and dividing the reflectance at the second location by the averaged reflectance values.

21. The apparatus of claim 2, wherein compensating for the platen non-uniformity includes considering the first and second locations separately.

22. An apparatus, comprising:
a printing device operatively interfaced with a media path;
an imaging area along the media path; means for positioning an article of media over the imaging area;
an optical imaging device configured for measuring reflectance of an object positioned over the imaging area and for providing image data to the printing device; and
an image processor programmed to process image data of a reference pattern that is imaged by the optical imaging device to determine a skew of the reference pattern in relation to the optical imaging device and to determine a distance and angle variation between the reference pattern and the optical imaging device, wherein the distance variation is for compensating for platen non-uniformity and wherein compensating for the platen non-uniformity includes averaging reflectance values of at least two locations on each side of a first location and dividing the reflectance at the first location by the averaged reflectance values.

23. The method of claim 1, wherein compensating for the platen non-uniformity comprises averaging reflectance values of at least two locations on each side of a first location and dividing the reflectance at the first location by the averaged reflectance values.

24. The method of claim 23, wherein compensating for the platen non-uniformity comprises averaging reflectance values of at least two more locations on each side of a second location and dividing the reflectance at the second location by the averaged reflectance values.

* * * * *

UNITED STATES PATENT AND TRADEMARK OFFICE
CERTIFICATE OF CORRECTION

Page 1 of 1

PATENT NO. : 9,258,454 B2
APPLICATION NO. : 11/356362
DATED : February 9, 2016
INVENTOR(S) : David H. Donovan et al.

It is certified that error appears in the above-identified patent and that said Letters Patent is hereby corrected as shown below:

Claims

In column 8, line 6, in Claim 4, delete "and/or" and insert -- and --, therefor.

In column 9, line 30, in Claim 21, delete "claim 2" and insert -- claim 20 --, therefor.

Signed and Sealed this
Twenty-fourth Day of May, 2016

Michelle K. Lee
*Director of the United States Patent and Trademark Office*